US008544073B2

(12) United States Patent
Walter Silhavy et al.

(10) Patent No.: US 8,544,073 B2
(45) Date of Patent: Sep. 24, 2013

(54) MULTI-PLATFORM SINGLE SIGN-ON DATABASE DRIVER

(75) Inventors: James Walter Silhavy, Durham, NC (US); Dirk Voet, Edegem (BE)

(73) Assignee: Progress Software Corporation, Bedford, MA (US)

(*) Notice: Subject to any disclaimer, the term of this patent is extended or adjusted under 35 U.S.C. 154(b) by 1834 days.

(21) Appl. No.: 10/887,340

(22) Filed: Jul. 7, 2004

(65) Prior Publication Data

US 2005/0108521 A1 May 19, 2005

Related U.S. Application Data

(60) Provisional application No. 60/484,654, filed on Jul. 7, 2003.

(51) Int. Cl.
*G06F 7/04* (2006.01)

(52) U.S. Cl.
USPC ............................................................ 726/8

(58) Field of Classification Search
USPC ............................................................ 726/8
See application file for complete search history.

(56) References Cited

U.S. PATENT DOCUMENTS

| | | | |
|---|---|---|---|
| 5,706,349 A | | 1/1998 | Aditham et al. |
| 5,944,824 A * | | 8/1999 | He ..................................... 726/6 |
| 6,556,995 B1 * | | 4/2003 | Child et al. ........................ 707/9 |
| 6,609,198 B1 * | | 8/2003 | Wood et al. .................... 713/155 |
| 7,089,584 B1 * | | 8/2006 | Sharma .............................. 726/4 |

| | | | |
|---|---|---|---|
| 2003/0033516 A1 * | 2/2003 | Howard et al. ............... 713/152 |
| 2003/0033535 A1 | 2/2003 | Fisher et al. |
| 2004/0003286 A1 * | 1/2004 | Kaler et al. .................... 713/201 |

OTHER PUBLICATIONS

Craig Mullins, DB@ Developers Guide, May 2000, Fourth Edition, pp. 1-6.*
JDBC TM Guide: Getting Started, Mar. 6, 1997, 54 pages.*
Charlie Lai, et al., "Implementing Security Using JAAS and Java GSS API," JavaOne, Sun's 2003 Worldwide Java Developer Conference, 28 pages.
Joshua Meckler, "Configuring Kerberos for Sybase,"Sybase ,2004, 10 pages.
"Use of JAAS Login Utility and Java™ GSS-API for Secure Message Exchanges," [Online] [Retrieved from the Internet Jan. 6, 2005] RL<http://java.sun.com/j2se/1.4.2/docs/guide/security/jgss/tutorials/Client . . . 13 pages.
JDBC™ Guide: Getting Started, Mar. 6, 1997, 54 pages.
Upadhyay, M. et al., Single Sign-On Using Kerberos in Java, Sun Microsystems, Inc., [online] [Retrieved on Jul. 3, 2005] Retrieved from the Internet <URL:http://java.sun.com/j2se/1.4.2/docs/guide/security/jgss/single-signon.html>.
Examination Report Under Section 18(3), GB0600555.7, May 9, 2006, 3 pages.
UK Patent Office Examination Report Under Section 18(3), dated May 9, 2006, 3 pages.

* cited by examiner

*Primary Examiner* — Cordelia Zecher
(74) *Attorney, Agent, or Firm* — Patent Law Works LLP

(57) ABSTRACT

Systems and methods of performing single sign-on authentication from multiple platforms when establishing a connection to a database are described. An application can securely access a database based on user credentials provided during a prior authentication. In an embodiment, single sign-on is accomplished by relying on existing and emerging authentication, security service, security mechanism, and wire protocols, enabling the creation of drivers to accommodate various platforms and databases. In another embodiment, a pure type 4 Java Driver is used, eliminating dependencies on native operating functionality.

29 Claims, 6 Drawing Sheets

MULTI-PLATFORM SINGLE SIGN-ON DATABASE DRIVER

CROSS REFERENCE TO RELATED APPLICATIONS

The present application claims the benefit of U.S. Provisional Patent Application Ser. No. 60/484,654 filed Jul. 7, 2003, to Silhavy et. al. entitled "Providing Single Sign-on and Secure Authentication in a Type Four JDBC Driver," which is hereby incorporated by reference in its entirety.

FIELD OF THE INVENTION

The invention relates to the field of database authentication, and more specifically, to providing an integrated security mechanism for logging on to a database by using credentials obtained at machine logon to accomplish database logon.

BACKGROUND OF THE INVENTION

Information stored in databases is generally accessed through database applications. To get to the data, a user typically must first log on to a machine or operating system (OS) then log on again to the particular database to which access is sought. Machine log on systems generally include a number of robust security measures such as auditing, password expiration, minimum password length and account lockout after multiple invalid login requests. Database logon system, however, are often less secure, containing fewer and less robust security measures. In addition, conventional database logon protocols often require a case-sensitive password and other logon data to be sent from the client to the database server through an unsecured network such as the Internet, increasing the risk that password and other security data will be intercepted.

The current approach has several shortcomings. First, it requires users to complete two logons, one to the operating system and one to the database, thereby increasing the inconvenience and administrative overhead associated with sign-on. It also makes the database more vulnerable to unauthorized use, since database logon is completed separately from operating system logon, and does not receive the benefits of operating system or machine level security systems. These problems are exacerbated when access to a database is required from different platforms, as is commonly the case in enterprise computing settings. Each platform may have its own requirements for completing secure access to the database, further multiplying the resource and support burden associated with logon.

Existing solutions to these problems are limited and piecemeal. For instance, some sign-on approaches that consolidate multiple logons exist. In addition, there are drivers, namely pure JAVA type 4 Java Database Connectivity (JDBC) drivers that provide platform-independent database access without native dependencies. Although this functionality has long been desired in the art, no unified solution for providing platform-independent database access through single sign-on has been provided to date. Suggestions to implement this functionality have similarly fallen short, contemplating only single sign-on access between applications on the same platform and/or the same operating environment. Thus, even assuming that these suggestions could be implemented, a user would have to use different drivers to accomplish single sign-on from different platforms or environments to a database server.

Thus, what is needed is a way to import the advantages of single sign-on to a way to access to a database from different platforms and operating environments.

SUMMARY OF THE INVENTION

The present invention overcomes the limitations of the prior art by providing methods and systems for enabling access to database systems using a single sign-on. In an embodiment, prior to database sign-on, a login credential is created responsive to input provided by a user during authentication of a user. This login credential is obtained and used to create a security context. The security context is used to establish a secure connection to the database for communication between a client application and the database. This provides automatic access to the database from the client application based on the prior authentication of a user.

In another embodiment, several elements comprise a system for authenticating a client application to a database based on prior authentication of a client user using a security mechanism. The system includes an authentication module for performing authentication of an instance of the user to the security mechanism and client and server security services modules for creating a secure connection for communications between the database and client application consistent with the security mechanism. The system also includes a driver for opening a wire protocol connection to the database from the application and for communicating requests from the client application to the database using the secure connection created by the security services module.

Also provided is a method of supplying access to a database from a client application based on prior authentication of a user. A connection object is created for connecting to the database. This connection object is used to create a secure connection based on a user credential generated during the prior authentication of the user. The secure connection is initialized, and communications with the database take place over the initialized secure connection. The client application operates in a client environment and the database operates in a database environment, and two environments are of different types.

BRIEF DESCRIPTION OF THE DRAWINGS

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
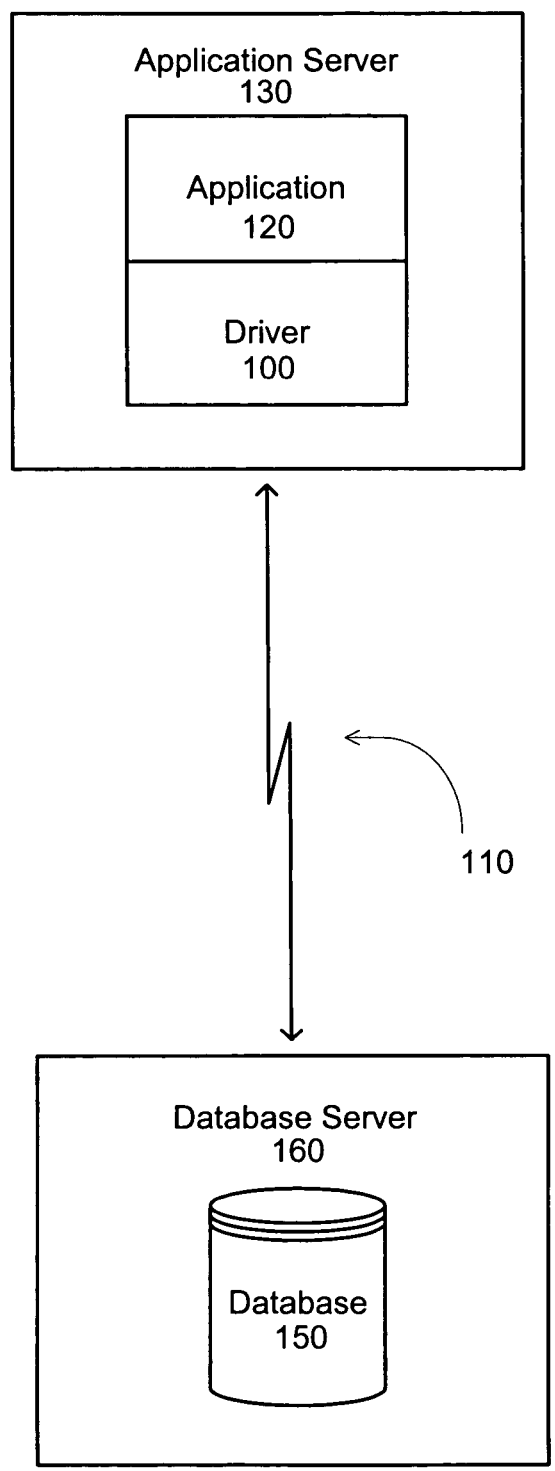
FIG. 1 is a block diagram of a database server and an application server hosting a multi-platform single sign-on database driver in accordance with an embodiment of the present invention.

FIG. 1 is a block diagram showing a multi-platform single sign-on database driver 100 in accordance with an embodiment of the invention. Shown in FIG. 1 is application server 130 in communication through signal line 110 with database server 160. Application server 130 hosts application 120, which is coupled to multi-platform single sign-on database driver 100, while database server 160 includes database 150. Application 120 accesses database 150 by way of driver 100, which in turn communicates with database 150 over signal line 110. As will be described in more detail, driver 100 obtains logon credentials from a security mechanism (not shown) and uses them to create a secure connection between driver 100 and database 150. Furthermore, driver 100 is capable of connecting application 120 from any variety of operating system platforms to database 150, which may be on the same or another platform as application 120. Through various mechanisms described below, a user can access database 150 from different operating environments while using application 120 without the need to specifically logon to database 150.

The application server 130 and database server 160 each comprises a machine such as a handheld or other portable device, workstation, network appliance, terminal, computing system, dedicated server, or other device for hosting application 120 and database 150, respectively, and for facilitating access by application 120 to database 150. In an embodiment, one or more servers 130 and 160 are formed from a computer and include at least one processor coupled to a bus. Coupled to the bus are a memory, storage device, keyboard, graphics adapter, pointing device, and network adapter. The servers 130 and 160 may be configured with relation to each other in any number of ways—for example, they may represent the same workstation or device, be geographically dispersed, belong to the same or different enterprises, and/or be linked over a private or public network. As described below, one or both of the servers 130 and 160 may contain one or more modules for carrying out various aspects of sign-on. As used herein, the term "module" can refer to program logic for providing the specified functionality that can be implemented in hardware, firmware, and/or software. Database server 160 and application server 130 may run on the same or different operating platforms, and within the same or different operating environments.

Application 120 on application server 130 represents a database application program that, during the normal course of operation, accesses database 150. Although only a single database 150 is shown in FIG. 1 for ease of understanding and description, those skilled in the art will recognize that the application 120 may access a plurality of databases. Preferably however, application 120 is a Java application and comprises an applet, servlet, or program coded in Java that only requires the resources of the Java Run-time Environment for operation and uses a JDBC driver to access a database. Multi-platform single sign-on database driver 100 is a driver compatible with various operating systems 210 that represents a set of programming interfaces for accessing database 150 from application 120. Driver 100 includes library routines to manipulate, update, and otherwise interface with database 150 and various operating environments. In an embodiment driver 100 comprises a JDBC driver, and can connect application 120 to a database that supports Structured Query Language on another or the same operation platform and/or operating environment. However, in another embodiment, driver could comprise a NET or other driver adapted to work with the operating system 200 or run-time environment 200. Although only a single application 120 is shown in FIG. 1 for ease of understanding and description, those skilled in the art will recognize there may be a plurality of applications 120 each having a driver 100.

Database 150 is accessed by application 120 through multi-platform single sign-on database driver 100 (described in more detail below). Database 150 may take various forms such as a relational, object, object-relational, and/or lightweight data access protocol database. It may comprise an Oracle, DB2, Sybase, Informix, SQL-server, or any other database, flat files, or other form of tabular data. Database 150 may be an enterprise, secure, or other database, may contain any kind of data, for any variety of applications, and may store different types of data in different portions of the database. Preferably, database 150 includes a database management system (DBMS) to process and respond to queries from client machines such as application server 130.

Driver 100 accesses database 150 through signal line 110. As used herein and throughout this application, the term "signal line" includes any connection or combination of connections supported by a digital, analog, satellite, wireless, firewire (IEEE 1394), 802.11, RF, local and/or wide area network, Ethernet, 9-pin connector, parallel port, USB, serial, or small computer system interface (SCSI), TCP/IP, HTTP, email, web server, or other communications device, router, or protocol. Although in FIG. 1, signal line 110 is shown as facilitating bi-directional communication, in other cases, signal line 110 may include a connection supporting unidirectional communication. Commands and responses between driver 100 and database 150 through signal line 110 are transmitted in accordance with a protocol governing data wire communication. In an embodiment, a Distributed Relational Database Architecture (DRDA) wire protocol is used to support communication to a DB2 database server 160. In another embodiment, a Tabular Data Stream (TDS) wire protocol is used to transmit data between application server 130 and a SQL database server 160 using a Transmission Control Protocol/Internet Protocol (TCP/IP) socket.

Figure 2:
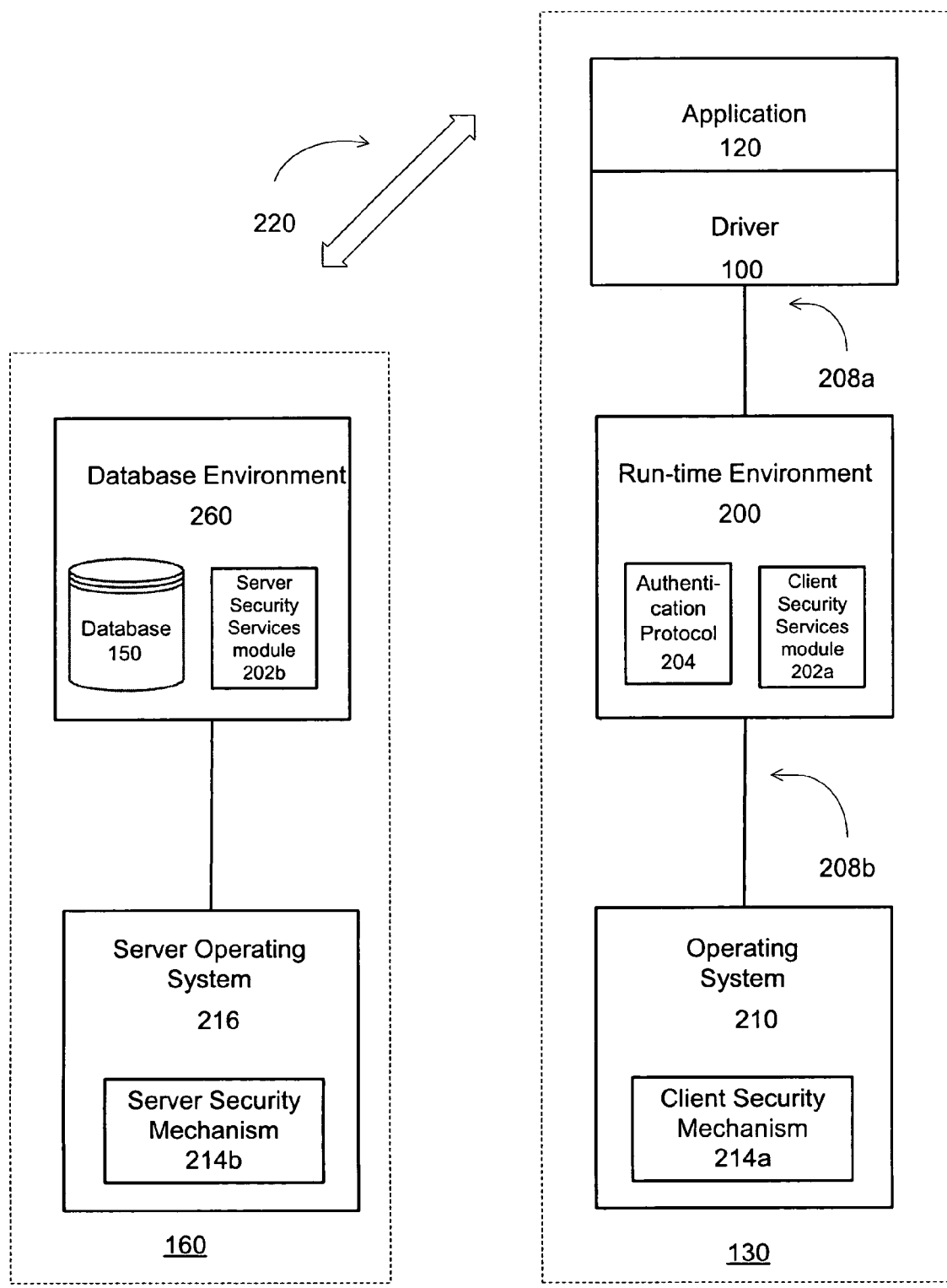
FIG. 2 is a block diagram of a multi-platform single sign-on database driver in a client server environment in accordance with an embodiment of the present invention.

FIG. 2 depicts a block diagram of a multi-platform single sign-on database driver 100 in a client-server environment in accordance with an embodiment of the present invention. In the embodiment of the invention depicted in FIG. 2, application 120 accesses database 150 using driver 100. In order to do this, driver 100 interfaces with client run-time environment 200, which interfaces with client operating system 210 to provide a secure connection or context 220 between database 150 and driver 100. In operation of multi-platform single sign-on database driver 100, an authentication module 204 is used to authenticate a user. Security services modules 202 on run-time environment 200 and database environment 260 use credentials provided during operating system or other authentication to create a secure context 220 for communications between driver 100 and database 150 utilizing the security mechanisms 214 on client operating system 210 and server operating system 216. As described herein, in an embodiment, driver 100 is capable of facilitating a secure context 220 regardless of the type of client operating system 210 used. Furthermore, client operating system 210 may differ from the server operating system 216 run on database server 160. The role of each of these components is discussed more in depth below.

Client operating system 210 hosts client security mechanism 214a from which driver 100 obtains security credentials in order to carry out a single sign-on. Operating system 210 can represent a Mac, Windows, Unix, Linux, IBM, OS/390, Z/OS, iSeries (AS/400), mainframe or other platform for use on a computer, workstation, or device. Operating system 210 of FIG. 2 includes security mechanism 214a for authenticating the user to the application server 130 or operating system 210. This authentication, which takes place prior to the database sign-on, supplies security credentials to be used to create secure connection 220. In another embodiment, however, client security mechanism 214a is for authenticating user to a secure access network, such as an intranet or virtual private network, or to a network domain or other virtual location. Client security mechanism 214a may comprise security calls that conform to an industry standard such as Kerberos (including Kerberos Version 5 GSS-API Mechanism), Simple Public-Key mechanisms, SmartCard, or biometric standard, for example, for use on a Windows XP platform. In the embodiment of the invention shown in FIG. 2, client security mechanism 214a is responsible for supplying the authentication that takes place prior to database sign-on and also for facilitating out database sign-on, however in other embodiments, different security mechanisms for carrying out each of these steps may be used. Client security mechanism 214a interfaces with server security mechanism 214b according to a common underlying security mechanism. In the case of an implementation relying on the Kerberos security mechanism, client and server security mechanisms communicate with the Kerberos Key Distribution Center (KDC) through signal line (not shown) in order to carry out token verification and associated authentication actions.

Authentication data used by security mechanisms 214 may take the form of a username, password, cryptographic or biologic data (e.g., fingerprint or retinal scan), and/or other authentication information associated with (and typically unique to) a single user. The authentication data could be static or dynamic, for instance changed according to an authenticator such as that used in a SecurID® system offered by RSA Security Inc. of Bradford, Mass. The security mechanisms 214 of FIG. 2 may specify a domain within operating system 210, or may enable machine-level or network-level logon. Furthermore, security mechanism 214 may comprise the use of one or more of the aforementioned or other authentication methods used in combination with each other.

In an embodiment, prior to attempting to access database 150 through application 120, a user will sign-on to client operating system 210, network or other domain using client security mechanism 214a. As a result of completing this sign-on, the user's security credentials are stored in a credentials cache (not shown) in accordance with security mechanism 214a. These credentials are later used by authentication module 204 and client security services module 202a calls to provide a secure connection 220 between database 150 and driver 100. Run-time environment 200 represents a set of resources required for the operation of application 120, and also includes authentication module 204 and client security services module 202a. Run-time environment 200 may include core classes, supporting libraries, various application protocol interfaces (APIs), and/or plug-ins depending on the needs of application 120. In an embodiment, run-time environment 200 represents the Java Run-time Environment (JRE) and includes Java Virtual Machine (JVM) to support a Java application 120. In another embodiment, run-time environment 200 is a .NET framework and includes NET resources for supporting .NET compatible XML-based applications, processes, and/or websites. In another embodiment, run-time environment 200 comprises common language runtime (CLR) and class libraries for operation with slim NET applications. As described later, database environment 260 may differ from client run-time environment 200; for instance, when a Java application 120 using a Java run-time environment 200 accesses a Microsoft SQL Server database 150 operating in a Microsoft environment 260.

In the embodiment of the invention shown in FIG. 2, run-time environment 200 includes authentication module 204 and client security services module 202a. In an embodiment, an instance of a user is authenticated based on authentication module 204 to the realm of the security mechanism 214 in order to obtain an authenticated subject that includes the user's security credentials. The authentication module 204 may comprise portions of a variety of authenticating modules including or within the Java Naming and Directory Interface (JNDI), UNIX Operating Environment, Windows NT, Kerberos, or Keystore. In an embodiment, the authentication module 204 includes industry standard Java Authentication and Authorization Service (JAAS) calls to authenticate the user to the client security mechanism 214a.

Client and server security services modules 202 follow a common protocol and comprise generic interfaces to security services module provided by security mechanism 214. Under this protocol, client and security services modules 202 create a secure connection 220 between application 120 and database 150. In an embodiment, security services modules 202 comprise code for carrying out security services in accordance with an industry security services standard, the Generic Security Service Application Programming Interface (GSS-API). This affords greater flexibility in implementation as GSS-API is adapted to work with a variety of security mechanisms 214 including Kerberos and the other security mechanisms described. Other existing or emerging protocols for security services module, however, may also be used.

In an exemplary embodiment of the invention, driver 100 is a pure Java JDBC driver, and does not rely on native operating system 210 methods. User attempts to access a Microsoft SQL Server database 150 from a Java application 120. The single sign-on functionality is implemented in driver 100 by integrating calls to perform various tasks provided by existing standards including JAAS, GSS-API, and the Kerberos Login Module component of the Java 2 Standard Edition (J2SE) platform with the Windows authentication (Kerberos) security mechanism 214 provided by Microsoft SQL Server. In the exemplary embodiment, the user is authenticated using JAAS authentication module 204. Security services modules 202 rely on GSS-API calls to locate the SQL Server service, pass the user's credentials to the SQL Server service to authenticate the user with SQL Server, and retrieve a security token that is populated with both the user's and the SQL Server service's security tickets. Driver 100 passes this security token to the SQL Server instance in its login packet to establish a secure connection 220 to an instance on the SQL Server database 150. Because driver 100 is a type 4 JDBC driver 100, the same driver 100 may support sign-on from multiple applications 120 operating on multiple platforms, for instance allowing for single sign-on to SQL server from a Unix machine or a Windows machine. In addition, the environment 200 of the application 120 may differ from the environment 260 of the database 260. As known by one of skill in the art, a Type 4 driver is a native-protocol pure Java driver. This kind of driver converts JDBC calls directly into the network protocol used by DBMSs. This allows a direct call from the client machine to the DBMS server and is particularly well suited for intranet access. In another embodiment, database 150 comprises a DB2 database. As DB2 can run on a variety of server 160 operating platforms, driver 100 supports access to DB2 database 150 from client operating platforms 210 that are different from the operating platform that hosts the DB2 database. For instance, in an embodiment, single sign-on from the same or different Java applications running on a Linux server or an IBM operating system could be accomplished to a DB2 database FIG. 2 shows driver 100, run-time environment 200, and operating system 210 coupled to each other through programming interfaces 208*a*, 208*b* for carrying out commands and calls between the various levels. Although FIG. 2 depicts client security services module 202*a* and authentication module 204 residing in run-time environment 200 and client security mechanism 214*a* hosted in operating system 210, the various elements may be configured differently, for instance security mechanism 214*a* may be located outside of operating system 210 and the authentication module 204 may be called from outside run-time environment 200. In other embodiments of the invention, run-time environment 200 may not be required and client security services module 202*a* and authentication module 204 may be supplied by other elements. FIGS. 3-5 and 6 show various flow charts for carrying out single sign-on authentication in accordance with an embodiment of the invention. For the sake of clarity, primary reference in the description of these figures is made to the exemplary embodiment of the invention described above. The use of these standard interfaces and protocols such as JAAS and GSS-API makes it easier for the single sign-on solution described to operate across various platforms. On the client side, one or more of these elements may be readily supplied by the Java Developer's Kit version 1.4 or higher. In a preferred environment, the TDS database protocol using the TCP/IP network protocol is used to access the Microsoft SQL Server database, although named pipes and other network protocols may also be possible in certain implementations. References to specific protocols and methods are referred to throughout the following description.

As one of skill in the art will appreciate and as is described, the class names that begin with SQLServer, TDS or Util are implemented by driver 100. In addition, references to important Java Run-time environment methods are fully qualified. As is customary in the art, the class names used additionally refer to calls determined by standards and protocols such as the TDS protocol. Although the following and other descriptions in this specification make reference to this particular set of operating systems, protocols, interfaces, and standards, it should be understood that such references are meant for illustration only, and are not intended to constrain the scope of the invention beyond the scope otherwise conveyed in the claims. At the same time, the advantages disclosed in this specification will be associated to varying degrees with the various embodiments described; and not every benefit described will be present in every embodiment of the invention disclosed.

Figure 3:
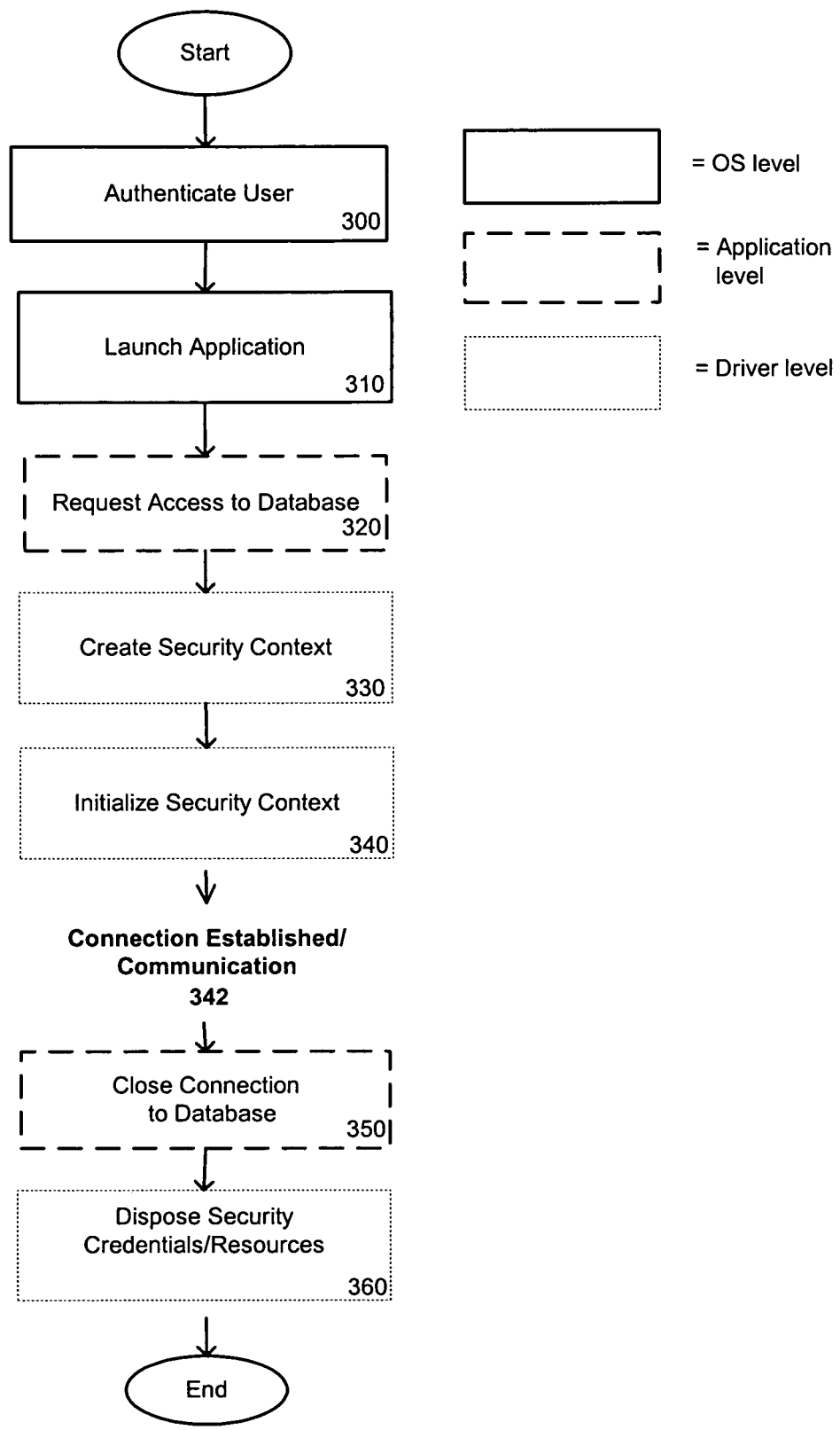
FIG. 3 shows a process flow for authenticating a user to access a database in accordance with an embodiment of the present invention.

Referencing the exemplary embodiment described, the process shown in FIG. 3 begins when the user is authenticated 300 on the Windows operating system 210 with an active directory environment that includes authentication module 204 of JAAS authentication calls. As described earlier, this authentication 300 step is alternatively implemented by a user signing on to a different operating system 210, or completing another logon or authentication process, potentially to a secure network or other restricted access domain. During the process of authentication 300, the user provides her credentials in accordance with the operating system security mechanism 214*a* (Kerberos), which in turn stores the credentials in credentials cache known as the local security authority (LSA) in memory resources associated with the operating system 210. As per the Kerberos protocol, the user also has a granting ticket after being logged on. Subsequent to authentication 300, the user launches 310 Java application 120. The subsequent steps 320-342, performed to achieve a connection 342 to the database 150, are carried out at the application and driver levels, and are not visible to the user, as indicated in FIG. 3.

After the user launches 310 the application, the application requests 320 access to the database. Driver 100 begins the process of opening a connection to a SQL Server instance of database 150 by creating a wire protocol object to initiate the access process. Driver 100 calls a SQLServerImplConnection.open method to create a connection object. In order to connect to a SQL server 150 instance, SQLServerImplConnection.open method then instantiates a TDSConnection object to support the connection at the wire protocol level. In an embodiment where the database 150 comprises a DB2 database, equivalent calls in the DRDA protocol would be used to create a connection object. Driver 100 is then ready to create 330 and initialize 340 a security context for supporting secure communications between driver 100 and database instance 150.

In an embodiment, the process of creating 330 a security context, discussed in more detail below with reference to FIG. 4, comprises several steps. First, the driver 100 uses the connection object to create a context. This is accomplished when the SQLServerImplConnection.open method calls TDSConnection.createSecurityContext to have the TDSConnection object construct and save an instance of the UtilSecurityContext class. Next, the driver 100 obtains an authenticated instance of the user, called an authenticated subject. In accordance with the Kerberos protocol, obtaining the authenticated subject requires stepping outside driver 100 via the JAAS to the operating system 210 where the user credentials are stored. Although the use of other security mechanisms 214 may change the location of the user credentials, the platform neutrality of Java allows JAAS to be used regardless of the operating system 210 from which the database 150 is accessed. The authenticated subject contains the user's security credentials and allows for a privileged communication to take place between the driver 100 and the authentication module 204. The authenticated subject is used to create a security context for communication between the driver 100 and database instance 150.

After the security context has been created 330, it is initialized 340 for communications. The step of initialization 340 is described in detail below with reference to FIG. 5. Subsequent to initialization 340, communications 342 between the client driver 100 and database 150 takes place. During a computing session, application 120 uses driver 100 to make requests of database 150 over secure connection 220, and replies are sent from database server 150 back through driver 100 to application 120. Correspondence between driver 100 and database 150 may be encrypted to further enhance security, or may take place in an unencrypted form.

At the end of the session, application 120 closes 350 connection 220 to the database. In the exemplary embodiment, SQLServerImplConnection.close method is called. The close method in turn disposes 360 or otherwise cleans up the security resources associated with the initialized context by calling UtilSecurityContext.cleanup. UtilSecurityContext.cleanup calls org.ietf.jgss.GSSCredentials.dispose and org.ietf.jgss.GSSContext.close to release the resources held by those objects. The cleanup method also calls javax.security.auth.login.LoginContext.logout to clean up the user security credentials obtained by the driver.

Figure 4:
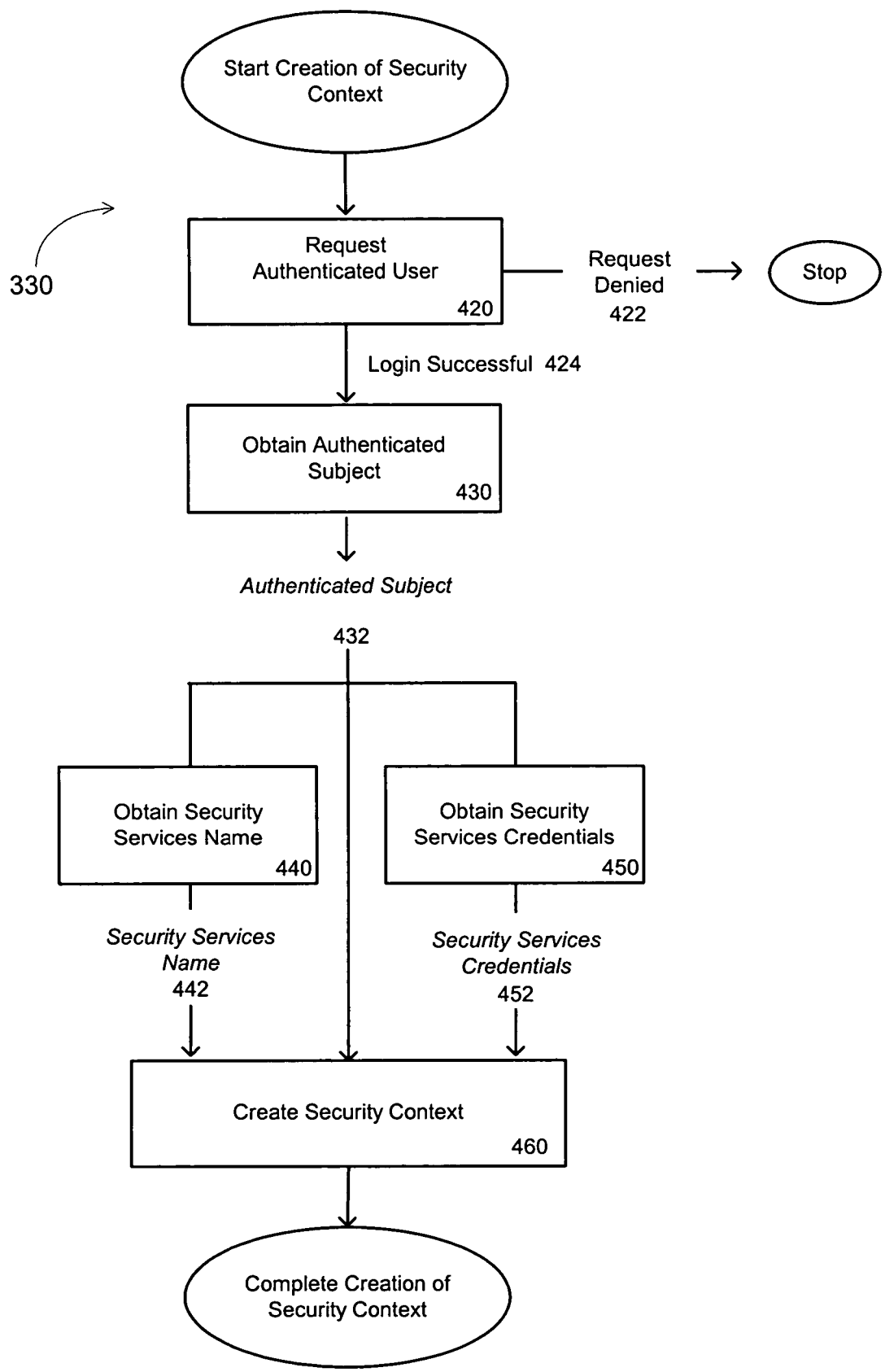
FIG. 4 shows a process flow for creating a security context in accordance with an embodiment of the present invention.

FIG. 4 shows a process flow for creating a security context in accordance with an embodiment of the present invention.

In an exemplary embodiment of the invention described above, creation of the UtilSecurityContext class comprises authenticating the user with Kerberos and obtaining the login credentials to create the service ticket for the SQL server instance the user is requesting access to. The driver 100 described above, through the UtilSecurityContext constructor, first constructs an instance of the UtilSecurityLogin class. The UtilSecurityLogin class then constructs an instance of the login context using JAAS protocol 204 call javax.security.auth.login.LoginContext. The LoginContext class makes a request 420 for the authenticated user. The LoginContext.login method of JAAS' authentication protocol, supplied by the authentication module 204 is called to authenticate 420 the current user with Kerberos. The dialog with the local credential cache and with the Kerberos Key Distribution Center (KDC) is handled by the LoginContext class.

If the request is denied 422 for any reason, for instance because it does not conform to the authentication protocol being used or the user's credentials cannot be provided, the process stops. If Login is successful 424, however, the driver obtains 430 an authenticated subject 432. The LoginContext.getSubject method of the JAAS authentication protocol supplied by authentication module 204 is used to obtain 430 the user's security credentials from the LSA, and encapsulate them in authenticated subject 432. The user's credentials are stored in the UtilSecurityLogin instance. The UtilSecurityContext constructor continues by extracting authenticated subject 432 from the UtilSecurityLogin instance. It uses authenticated subject 432 to obtain security service name 440 and credentials 450 needed to communicate with security mechanism 214 to complete logon to database 150.

In conformance with GSS-API supplied security services module 202, the user's security credentials, contained within the authenticated subject 432 are used to create org.ietfjgss.GSSName 442 and org.ietfjgss.GSSCredential 452 objects. Because GSS-API is supported in various database protocols including TDS for use with SQL Server or DRDA for use with DB2, access to a variety of types of databases is possible in various embodiments of the invention relying on GSS-API. Together authenticated subject 432, security service name (org.ietfjgss.GSSName) 442, and security service credential (org.ietfjgss.GSSCredential) 452 are used to create 460 a org.ietfjgss.GSSContext object, the security context. The security context later orchestrates the authentication exchange between the client (i.e. the driver 100), the security mechanism 214 and the requested database server 160; further described in reference to FIG. 5.

Figure 5:
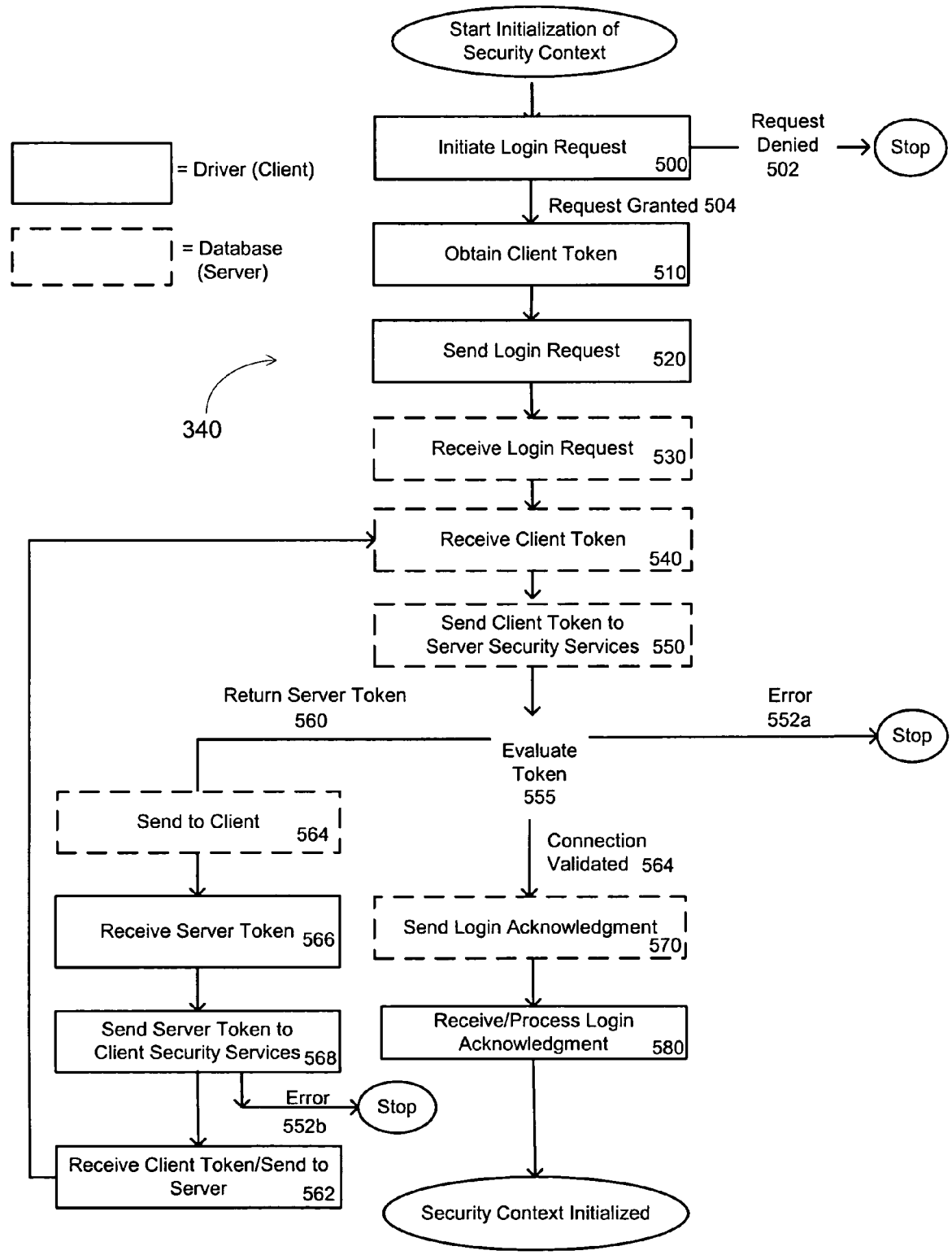
FIG. 5 shows a process flow for initializing a security context in accordance with an embodiment of the present invention.

Once the security context has been created 460, the security context is initialized as shown in FIG. 5 in accordance with an embodiment of the present invention. Continuing with the example described above, after the security context is created 460, control is returned to the driver's 100 SQLServerImplConnection.open method. With the security context, driver 100, through SQLServerImplConnection.open method, initiates 500 creation of a login request according to database wire protocol, in the case of a SQL server database 150 by creating a TDSLoginRequest instance and calling the TDSLoginRequest.submitRequest method, but in the case of a DB2 database, by relying on DRDA protocols. The TDSLoginRequest.submitRequest method populates the various fields of the login record.

In order to populate the LoginRequest security token field required by the security mechanism (Kerberos) 214, the submitRequest method requests the client token by using the UtilSecurityContext instance from the TDSConnection to call the UtilSecurityContext.getToken method. The UtilSecurityContext.getToken method in turn calls the org.ietf.jgss.GSSContext.initSecContext to initiate the authentication sequence of security mechanism 214a (Kerberos) and get the client token to submit to the database server 160. The token is obtained 510 and returned to the TDSLoginRequest.submitRequest which places the token in the appropriate field of the login request and then sends 520 the login request to the database 150. Control is returned to the SQLServerImplConnection.open method.

The database server 160 receives 530 the login request, and with it, receives 540 the client token. In accordance with the Kerberos protocol, database server 160 then sends 550 the client token to the server 160 via server security services module 202b. Security mechanism 214b evaluates 555 the token per a server security service 202b request. This process comprises sending the token to the KDC, which could be located on a remote server, for verification. If the token is not authentic, then security services module 202b sends back an error message 552a and the logon attempt has failed. Assuming that the token is authentic, there are two possibilities. First, server security mechanism 214b may return a message through security services module 202b that the connection 220 has been validated 564. At that point, the database 150 sends 570 a login acknowledgment to the client driver 100. Client driver 100 receives 580 and processes 580 the login acknowledgement, and the security context is initialized, enabling communication.

As a second possibility, if the token is authentic, a server token that requires further validation may be returned 560 to database server 160 through server security services module 202b. Database server 160 then sends 564 the server token back to the driver 100 as part of SQL Server reply. The driver 100 receives 566 the client token as SQLServerImplConnection.open processes the SQLServer reply. The SQLServerImplConnection.open open method then calls the TDSLoginRequest.establishSecurityContext method to process the token by sending 568 it for verification to client security mechanism 214a via client security services module 202a calls and test its authenticity. If the server token is inauthentic, an error message 552b is returned. However, as before, if the server token is authentic, client 100 may receive 562 a client token and send 562 it to the server 160, which in turn may receive 540 client token. This process may repeat before the connection is established.

Figure 6:
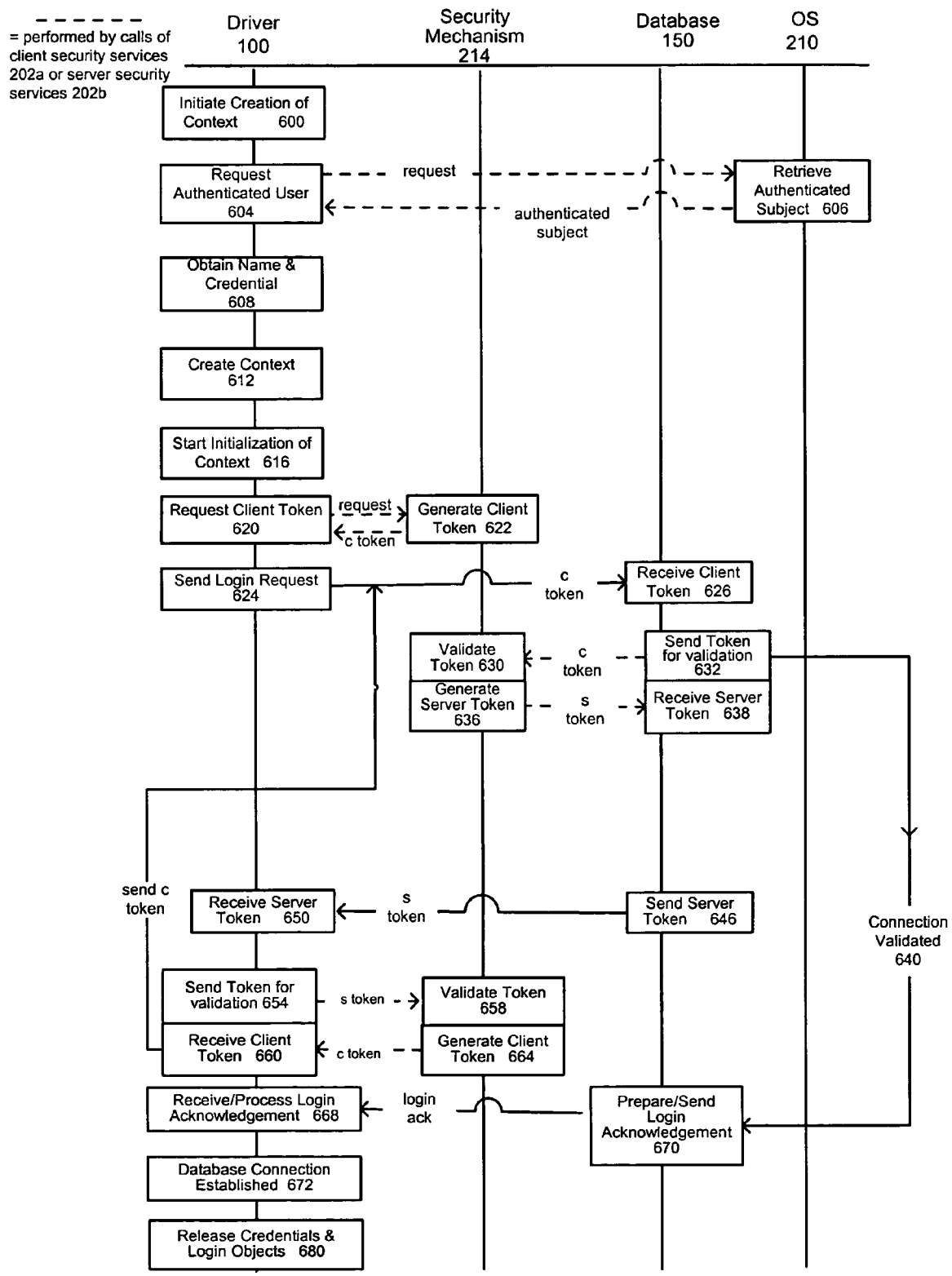
FIG. 6 is an event diagram of the operations of a multi-platform single sign-on database driver in accordance with an embodiment of the present invention.

FIG. 6 is an event diagram of the process depicted in FIGS. 4 and 5 in accordance with an embodiment of a multi-platform single sign-on database driver 100. As shown in FIG. 6, driver 100 initiates 600 and creates 612 the context by retrieving 606 and obtaining an authenticated subject 608 (generated based on user security credentials) from the operating system. As shown, this request is made and fulfilled through client security services module 202a calls (depicted through dashed lines) made to the client security mechanism 214a. For the sake of convenience, in the drawing, "security mechanisms 214" is used to refer to one or the other of client security mechanism 214a or server security mechanism 214 b, and dashed lines are used to represent steps performed by calls of client security services module 202a or server security services module 202b. Driver 100 does not interact with operating system 210 directly but requests and receives the authenticated subject through client security mechanism 214a. The driver then creates the context 612 and begins to initialize 616 the context. As shown, this is the only step that involves interaction with the client operating system 210, subsequent steps are performed by the driver or database including through security mechanism 214.

Security services module 202a calls are then used by the driver 100 to request 620 the client token for formulating the driver's login request, which is then sent 624 directly to the database 150. While the database 150 and driver 100 proceed to subsequently exchange 646 & 650 one or more tokens directly, over the course of initializing 616 the context, the process of token validation 630 & 632, 654 & 658 are carried out through client security services module 202a calls to the client security mechanism 214a and server security services module 202b calls to the server security mechanism 214b. As shown, after database 150 sends 632 a client token for validation to the server security mechanism 214b, it may either receive a message that the connection has been validated 640, or may receive 638 a server token to return to the driver 100. Although not shown in FIG. 6, as mentioned previously, security mechanism 214b may also fail to validate the token, thereby ending the logon attempt. Once a database connection has been established 672, however, communications can take place between the driver 100 and database 150. At the end of the session, driver 100 releases 680 the credentials and login resources used to establish the security context.

The invention claimed is:

1. A method of automatically providing access to a database from a client application based on prior authentication of a user, the method comprising:
   obtaining a login credential created responsive to an input provided by the user during the prior authentication;
   creating, by a driver, a security context that includes a context object based at least in part on an authenticated subject representing an authenticated instance of the user, the authenticated subject including the login credential;
   initializing, by the driver, the security context including creating a login request based on a wire protocol and populating the login request with a token based on an instance of the security context; and
   using the security context to establish a secure connection to the database for communication between the client application and the database.

2. The method of claim 1 wherein the steps of obtaining the login credential and creating the security context are performed by the driver which is a pure Java Type 4 driver.

3. The method of claim 2 wherein the driver is a JDBC driver.

4. The method of claim 1 wherein an operating platform of the client application differs from an operating platform of the database.

5. The method of claim 1 wherein an operating platform of the client application is selected from a group consisting of: a Unix platform, an IBM platform, and a Windows platform.

6. The method of claim 1 wherein the database is a Microsoft SQL server database.

7. The method of claim 1 wherein the database is a DB2 database.

8. The method of claim 1 wherein the secure connection is implemented over a TCP/IP protocol.

9. The method of claim 1 wherein the login credential is one selected from a group consisting of: a user name, a password, cryptographic data, and biologic data.

10. The method of claim 1 wherein an operating environment of the client application differs from an operating environment of the database.

11. A non-transitory computer-readable storage medium storing computer-executable program code for authenticating a client application to a database based on prior authentication of a client user using a security mechanism, the computer-executable program code comprising:
   an authentication module for performing authentication of an instance of the client user to the security mechanism based on a client user credential generated during the prior authentication;
   a client security services module for facilitating a secure connection for communications between the database and the client application consistent with the security mechanism and communicating with the authentication module to create a security context that includes a context object based at least in part on an authenticated subject representing an authenticated instance of the client user, the authenticated subject including a login credential; and
   a driver for creating a wire protocol connection to the database from the client application based on a wire protocol and for communicating requests from the client application to the database using the secure connection facilitated by the client security services module, the driver initializing the security context by creating a login request based on the wire protocol and populating the login request with a token based on an instance of the security context.

12. The computer-readable storage medium of claim 11 wherein the security mechanism comprises Kerberos, the authentication module comprises code for complying with a JAAS, and the client security services module comprises code for conforming with a GSS-API.

13. The computer-readable storage medium of claim 11 wherein the wire protocol connection is created in accordance with a TDS protocol.

14. The computer-readable storage medium of claim 11 wherein the wire protocol connection is created in accordance with a DRDA protocol.

15. The computer-readable storage medium of claim 11 wherein the driver is configured to communicate requests from a plurality of client applications and further wherein the plurality of client applications are configured to operate on a plurality of different and distinct operating platforms.

16. The computer-readable storage medium of claim 11 wherein the driver is a Type 4 JDBC driver.

17. The computer-readable storage medium of claim 11 wherein the authentication module and the client security services module are supplied on a client side through a run-time environment.

18. The computer-readable storage medium of claim 17 wherein the run-time environment comprises a Java run-time environment.

19. The computer-readable storage medium of claim 17 wherein the run-time environment comprises .NET resources for supporting a .NET client application.

20. A method of supplying automatic access to a database from a client application based on prior authentication of a user, the method comprising:
   creating a connection object for connecting the client application to the database;
   using the connection object to create a secure connection based on a user credential generated during the prior authentication of the user and a security context, the security context including a context object and created based at least in part on an authenticated subject representing an authenticated instance of the user, the authenticated subject including a login credential;
   initializing the secure connection including creating a login request based on a wire protocol and populating the login request with a token based on an instance of the security context; and communicating with the database over the initialized secure connection, wherein the client application operates in a client environment and the database operates in a database environment, and the client environment comprises a different type of environment than the database environment.

21. The method of claim 20 wherein the step of creating the secure connection further comprises:
requesting the user credential generated during the prior authentication of the user;
obtaining the user credential;
using the user credential to generate an authentication credential; and
using the user credential and the authentication credential to create the secure connection.

22. The method of claim 21 wherein the step of initializing the secure connection further comprises:
obtaining a client token;
using the client token to complete the login request to log on to the database;
sending the login request to the database;
receiving a server token;
sending the server token to a client security services module for authentication of the server token;
receiving a login acknowledgment from the database; and
processing the login acknowledgement.

23. The method of claim 20 wherein the connection object is a TDS wire connection object.

24. The method of claim 20 wherein the steps of creating the connection object, using the connection object to create the secure connection, initializing the secure connection, and communicating with the database over the initialized secure connection are performed by a Type 4 JDBC driver.

25. A method of automatically providing access to a database to a user based on prior authentication of the user, the method comprising:
receiving a log on request from a driver, wherein the log on request includes a client token and is received subsequent to establishment of a security context, the establishment of the security context accomplished using a user credential generated during the prior authentication of the user, the security context including a context object and created based at least in part on an authenticated subject representing an authenticated instance of the user, the authenticated subject including a login credential, the security context initialized by creating the log on request based on a wire protocol and populating the log on request with the client token based on an instance of the security context;
extracting the client token from the log on request;
sending the client token to a security services module for authentication of the client token; and
sending an acknowledgement of the log on request to the driver.

26. The method of claim 25, wherein the database comprises a DB2 database.

27. The method of claim 25, wherein the steps of receiving the log on request from the driver, extracting the client token from the log on request, sending the client token to the security services module, and sending the acknowledgement of the log on request to the driver are performed by the database.

28. The method of claim 25, wherein the driver comprises a Type 4 JDBC driver.

29. The method of claim 25 wherein the log on request is further transmitted over a TCP/IP protocol.

* * * * *